United States Patent [19]
Fujihara

[11] Patent Number: 5,894,579
[45] Date of Patent: Apr. 13, 1999

[54] POWER MANAGEMENT SYSTEM AND METHOD

[75] Inventor: Shinobu Fujihara, Yamato, Japan

[73] Assignee: International Business Machines Corporation, Armonk, N.Y.

[21] Appl. No.: 08/804,725

[22] Filed: Feb. 21, 1997

[30] Foreign Application Priority Data

Feb. 26, 1996 [JP] Japan ................................. 8-037639

[51] Int. Cl.⁶ .................................................. G06F 1/32
[52] U.S. Cl. ............................. 395/750.06; 395/750.07; 364/707
[58] Field of Search ..................... 395/750.01–750.08; 364/707

[56] References Cited

U.S. PATENT DOCUMENTS

| | | | |
|---|---|---|---|
| 5,339,445 | 8/1994 | Gasztonyi | 395/750.06 |
| 5,532,945 | 7/1996 | Robinson | 364/707 |
| 5,535,401 | 7/1996 | Rawson, III et al. | 395/750.08 |
| 5,560,022 | 9/1996 | Dunstan et al. | 395/750.01 |
| 5,652,893 | 7/1997 | Ben-Meir et al. | 395/750.02 |
| 5,692,204 | 11/1997 | Rawson et al. | 395/750.08 |

*Primary Examiner*—Ayaz R. Sheikh
*Assistant Examiner*—Paul R. Myers
*Attorney, Agent, or Firm*—Daniel E. McConnell; Anthony N. Magistrale

[57] ABSTRACT

An apparatus and a method for managing power, in a computer system, whereby it is possible to so manage power, where there are a plurality of peripheral devices which can be simultaneously operated, that the total power consumed by such peripheral devices does not exceed a predetermined capacity.

5 Claims, 6 Drawing Sheets

Device programs and queue control program

Fig.7

| Request type | Power consumption |
|---|---|
| FD writing | 300 mW |
| FD reading | 200 mW |
| CD-ROM reading | 400 mW |
| HD writing | 350 mW |
| HD reading | 300 mW |

Fig.8

| No. | Request condition | Newly required power (Pnew) | Sum of power before determination (Psum) | Determination | Sum of power after determination |
|---|---|---|---|---|---|
| 1 | Issue FD reading | 200 mW | 200 mW | Execute | 200 mW |
| 2 | Issue CD-ROM reading | 400 mW | 600 mW | Execute | 600 mW |
| 3 | Issue HD writing | 350 mW | 950 mW | Standby in queue | 600 mW |
| 4 | Issue FD writing | 300 mW | 900 mW | Standby in queue | 600 mW |
| 5 | Complete FD reading | -200 mW | | | 400 mW |
| 6 | | | | Extract request from queue | |
| 7 | Extract HD writing request from queue | 350 mW | 750 mW | Execute | 750 mW |
| 8 | | | | Extract request from queue | |
| 9 | Extract FD writing request from queue | 300 mW | 1050 mW | Continue standby in queue | 750 mW |
| 10 | Complete CD-ROM reading | -400 mW | | | 350 mW |
| 11 | | | | Extract request from queue | |
| 12 | Extract FD writing request from queue | 300 mW | 650 mW | Execute | 650 mW |
| 13 | Complete HD writing | -350 mW | | | 300 mW |
| 14 | Complete FD writing | -300 mW | | | 0 mW |

POWER MANAGEMENT SYSTEM AND METHOD

BACKGROUND OF THE INVENTION

The present invention relates to an apparatus and a method for managing power, mainly for a computer system, and especially to an apparatus and a method whereby it is possible to so manage power for a computer system wherein there is a plurality of peripheral devices, which can be simultaneously operated, that the total power consumed by such devices does not exceed a predetermined capacity.

Conventionally, with a computer system that permits the simultaneous execution of jobs by a plurality of peripheral devices, such peripheral devices are independently controlled, and the amount of power supplied for the collective execution of jobs by these peripheral devices is the total of the maximum power consumed by each of these peripheral devices when executing a job.

For example, for a computer system in which a floppy disk drive and a CD-ROM drive are included as peripheral devices, the power supply capacity for a power source is so set that it equals the total of the maximum power required for the operation of the floppy disk drive and that required for the operation the CD-ROM drive. This is done in order to prevent the overloading of the power source under all permissible operating conditions. Under normal operating conditions, however, as maximum power consumption by both the peripheral devices will seldom occur at the same time, this results in the power source not being used efficiently. Furthermore, the power consumption required is so large that providing it interferes with attempts to reduce the size and weight of the computer system as a whole.

SUMMARY OF THE INVENTION

It is one purpose of the present invention to provide improved efficiency in the use of a power source by so controlling the execution of jobs by peripheral devices, in accordance with the power required for each job, as to remove the above described shortcoming.

In accomplishing the present invention, a computer system includes a plurality of physical devices, and device programs that are inherent to the physical devices, and has 1) a "queue control program" for managing execution requests that originate at the several device programs, and 2) an "FIFO buffer" that is used to store the execution requests received by the queue control program. All the requests that originate at the control programs are stored in the FIFO buffer and managed by the queue control program, which extracts requests from the FIFO in consonance with the order in which they are received. When the total of the power required for processing a new request and of the power required for a currently executed request is smaller than the maximum power that is available for use, the queue control program forwards the new request to a device control program for processing. When the total power required exceeds the maximum power that is available for consumption, instead of forwarding the request for processing, the queue control program places the request in the standby state by storing it in its queue.

BRIEF DESCRIPTION OF THE DRAWINGS

Some of the purposes of the invention having been stated, others will appear as the description proceeds, when taken in connection with the accompanying drawings, in which:

FIG. 7 is a table showing power ratings for the individual devices of the present invention; and FIG. 8 is a table showing operation examples for the present invention.

DESCRIPTION OF THE PREFERRED EMBODIMENT(s)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Although for convenience sake one of the notebook personal computers that have recently become popular is mainly employed for explaining the arrangement and the operation of the present invention, the use of the present invention is not limited to such computers; it can be employed for desktop, floor model, and other computer types.

Figure 1:
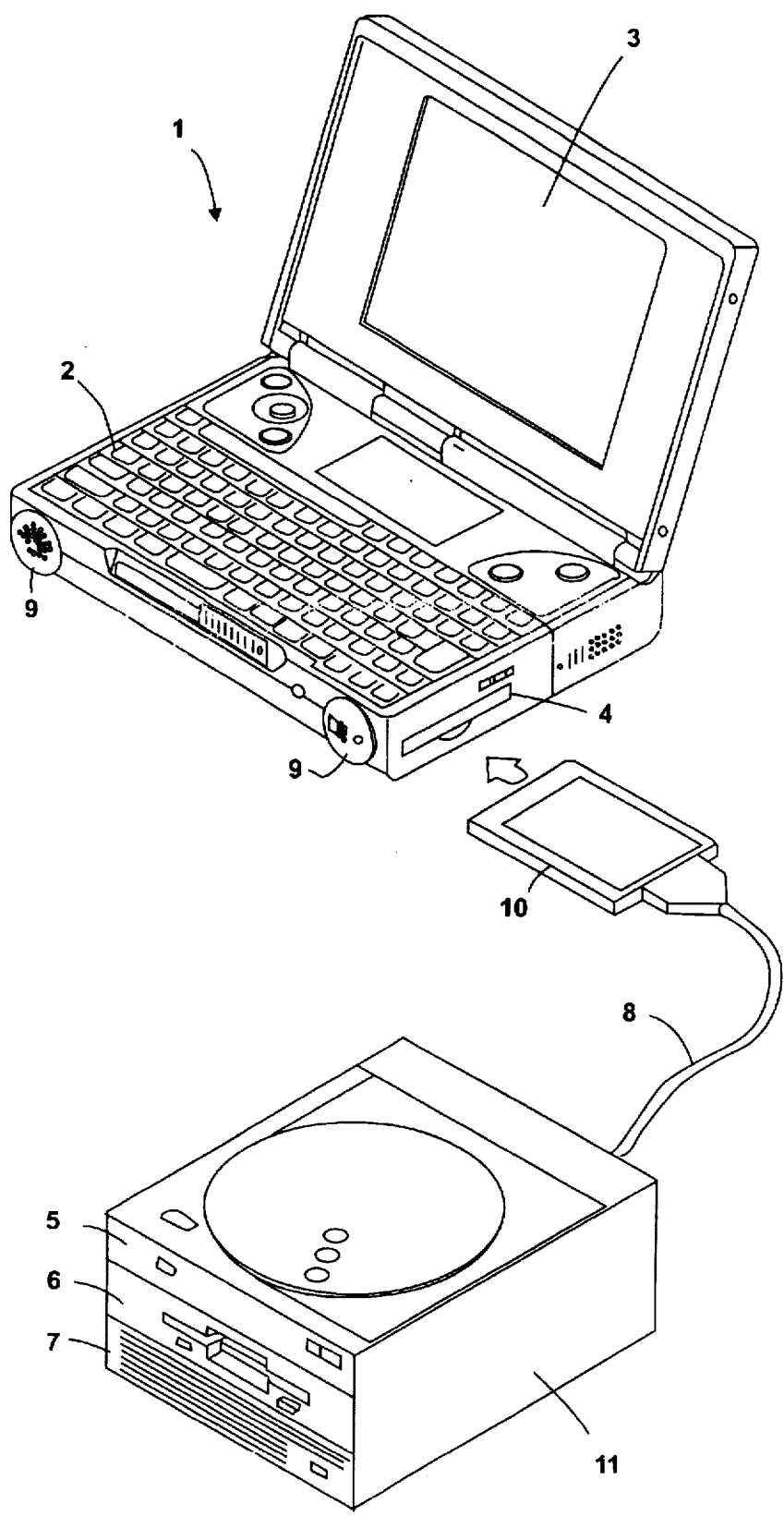
FIG. 1 is a diagram illustrating a computer system for carrying out the present invention.

FIG. 1 illustrates a complete computer system to be used for carrying out the present invention. A main body 1 of the computer system may be a portable PC, as illustrated, a desktop or other type of PC, or a workstation. The computer system 1 comprises a keyboard 2 that serves as a device for inputting characters, etc., a liquid crystal panel 3 that serves as a device for outputting characters and graphics, and loudspeakers 9 that serve as devices for outputting sounds. Some computer systems have, as a standard, a video camera that serves as an image input device.

Also shown is a multimedia box 11 that can be connected to the main body of the computer system by a PCMCIA card 10 that is attached to the end of a cable 8. Incorporated in the multimedia box 11 are a CD-ROM drive 5, a floppy disk drive (FDD) 6, and a hard disk drive (HDD) 7. As the multimedia box 111 does not have its own power supply circuit, the power required for the multimedia box 111 is supplied from the main body 1 via the PCMCIA card 10 and the cable 8.

Figure 2:
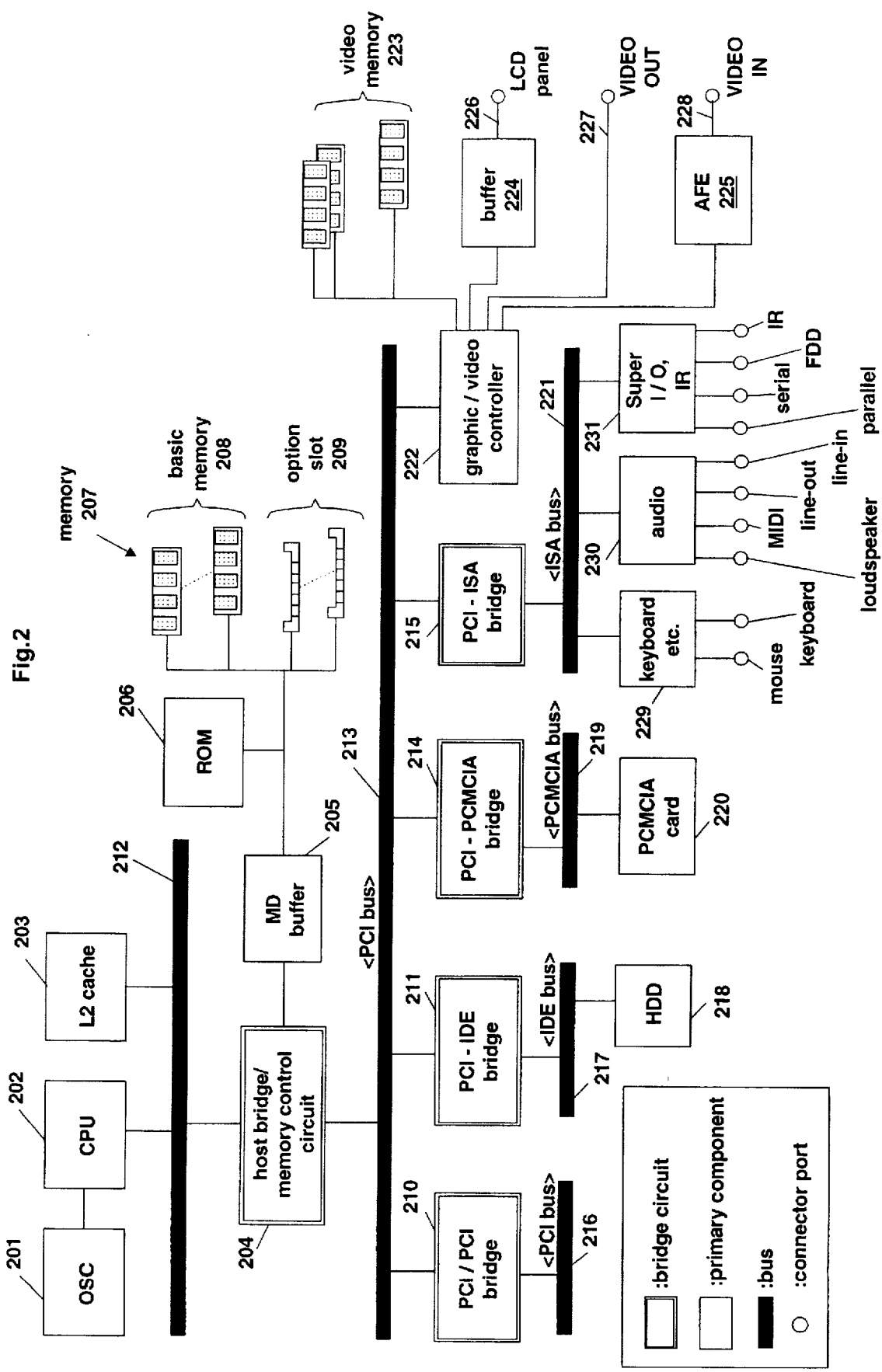
FIG. 2 is a block diagram illustrating a logical circuit inside the computer system for carrying out the present invention.

FIG. 2 is a block diagram illustrating a logical circuit that is usually constructed on a mother board (a planar board) mounted inside the notebook computer in FIG. 1. In the latest personal computer systems, pluralities of buses are provided to connect together devices having various processing speeds, and circuits, or so-called bus bridges, communicate with these buses and perform protocol conversion between them. As typical examples of such buses, in FIG. 2 are shown a CPU local bus 212, to which is directly connected a CPU 202; PCI buses 213 and 216, to which are connected relatively high speed peripheral devices; and an ISA bus 221, a PCMCIA bus 219 and an IDE bus 217, to which are connected relatively low speed peripheral devices.

Also shown in FIG. 2 are a host bridge/memory control circuit 204 that connects the CPU local bus 212 to the PCI bus 213; a PCI-ISA bus bridge circuit 215 that connects the PCI bus 213 to the ISA bus 221; and a PCI-PCMCIA bus bridge circuit 214 that connects the PCI bus 213 to the PCMCIA bus 219.

Further, the buses communicate with a plurality of peripheral devices whose processing speeds match the speeds of the buses. For example, the highest speed CPU local bus 212 communicates with the CPU 202; the PCI bus 213 communicates with a high speed graphic/video controller 222; and the ISA bus 221 communicates with a keyboard controller 229, an audio controller 230, and a Super I/O controller 231, which is a general-purpose I/O controller.

The host bridge/memory control circuit 204, which not only has a bus bridge function but also has a memory control function, is connected to a BIOS ROM 206 and a main memory RAM 207 via a memory data buffer 205.

The graphic/video controller 222, which is connected to the PCI bus 213, has a screen display video memory 223. The graphic/video controller 222 employs a digital signal to communicate with an LCD panel via a buffer 224, digitizes the analog video input from an external device via an analog front end (AFE) 225, and fetches the digital data.

Figure 3:
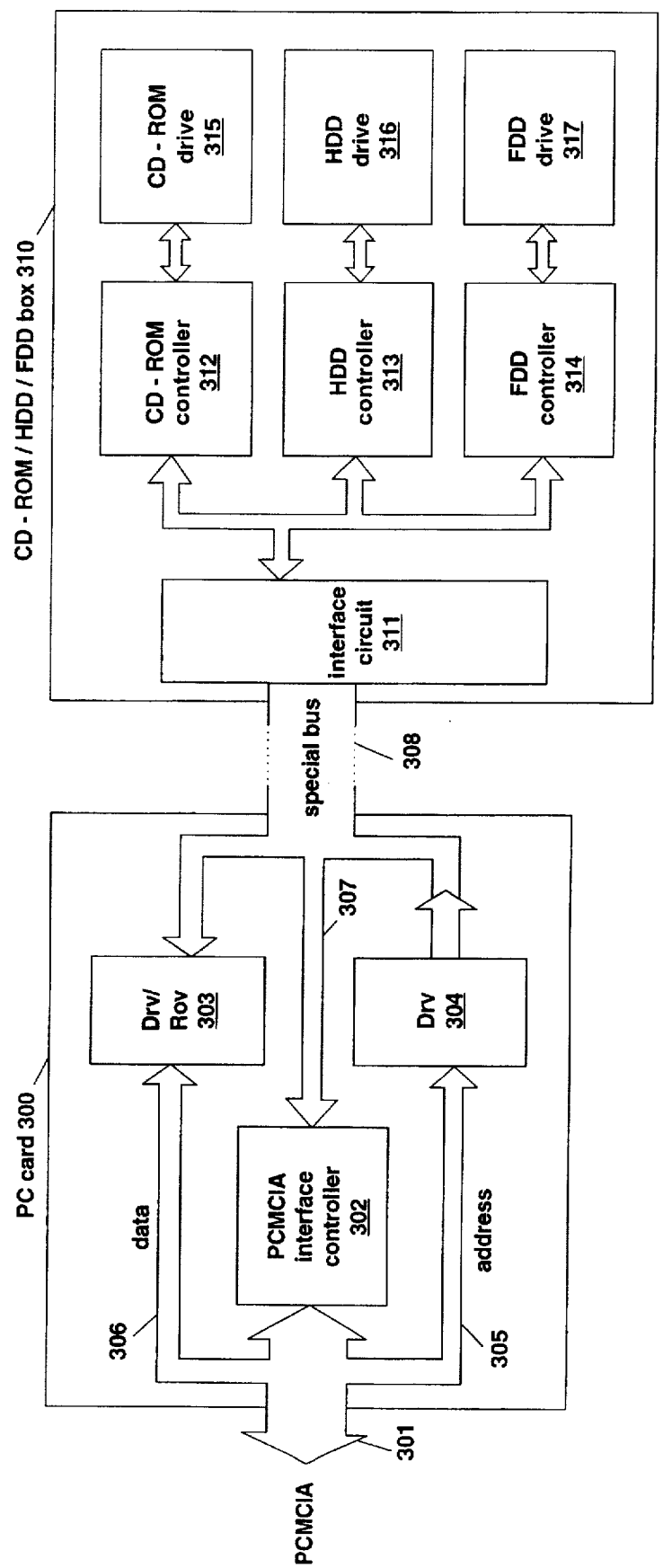
FIG. 3 is a diagram illustrating a multimedia box and a PC card according to the present invention.

FIG. 3 is a detailed diagram illustrating the internal arrangement of the multimedia box 11 in FIG. 1, which is the object of the present invention. A CD-ROM-HDD/FDD box 310 is connected to the computer system 1 via an interface. In this specification, a PCMCIA adapter that is widely used for computers is employed as the interface example. In this case, therefore, a PC card 300 is connected to a PCMCIA bus 301 of the computer system 1, and the CD-ROM/HDD/FDD box 310 is connected to the PC card 300 via a special bus 308.

The PC card 300 has a PCMCIA interface controller 302 that serves as an interface between the PCMCIA bus 301 of the computer system 1 and the special bus 308. Further, in the PC card 300 is provided a driver/receiver 303 for a data bus and a driver 304 for an address bus, both of which interact with the interface controller 302.

The special bus 308 that has been adapted by the PCMCIA interface controller 302 is connected to the CD-ROM/ HDD/FDD box 310 via the cable 8, and is further connected to the controllers for the individual devices by an interface circuit 311 inside the CD-ROM/HDD/FDD box 310.

The CD-ROM/HDD/FDD box 310 includes various types of storage devices, such as a CD-ROM drive 315, a hard disk drive (HDD) 316, and a floppy disk drive (FDD) 317. These drives communicate with the interface circuit 311 via corresponding controllers connected to the interface circuit 311, i.e., a CD-ROM controller 312, an HDD controller 313, and an FDD controller 314.

Figure 4:
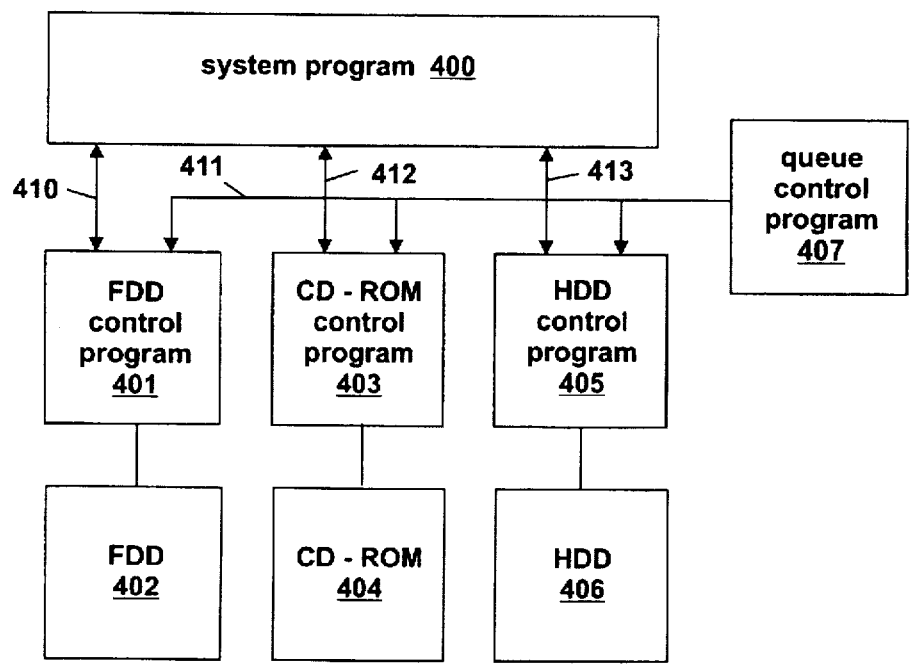
FIG. 4 is a diagram showing a relationship between device programs and a queue control program, which are components of the present invention.

The software structure according to the present invention will now be described while referring to FIG. 4. As was explained while referring to FIG. 3, the CD-ROM/HDD/ FDD box 310 includes an FDD 402, a CD-ROM 404 and an HDD 406. For each of the physical devices there is a corresponding control program. An FDD control program 401 controls the operation of the FDD 402, a CD-ROM control program 403 controls the CD-ROM 404, and an HDD control program controls the HDD 406.

The FDD control program 401 services "FD writing" requests and "FD reading" requests intended for the FDD 402.

The CD-ROM control program 403 services "CD-ROM reading" requests intended for the CD-ROM 404.

The HDD control program 405 services "HD writing" requests and "HD reading" requests intended for the HDD 406.

The control programs for the physical devices are controlled by a system program 400, such as an operating system (OS), that conventionally issues execution requests to control programs, regardless of whether other control programs are currently servicing requests. In other words, when the system program issues a request to a specific control program, such as the FDD control program, it does not take into consideration whether or not a condition exists wherein the CD-ROM control program or the HDD control program is currently servicing a request.

On the other hand, according to the present invention, a queue control program 407 prepares in advance a table wherein is entered the power required for each control program when it services a request, that is, in this embodiment a table such as is shown in FIG. 7 is prepared, and thereafter the queue control program 407 so controls the transmission of requests, to the device control programs, that the sum (Psum) of the power consumption requirements for servicing requests does not exceed the maximum capacity (Pmax) of the power source for the system. The maximum capacity (Pmax) of the power source allocated for the three physical devices in this embodiment is 800 mW.

Figure 5:
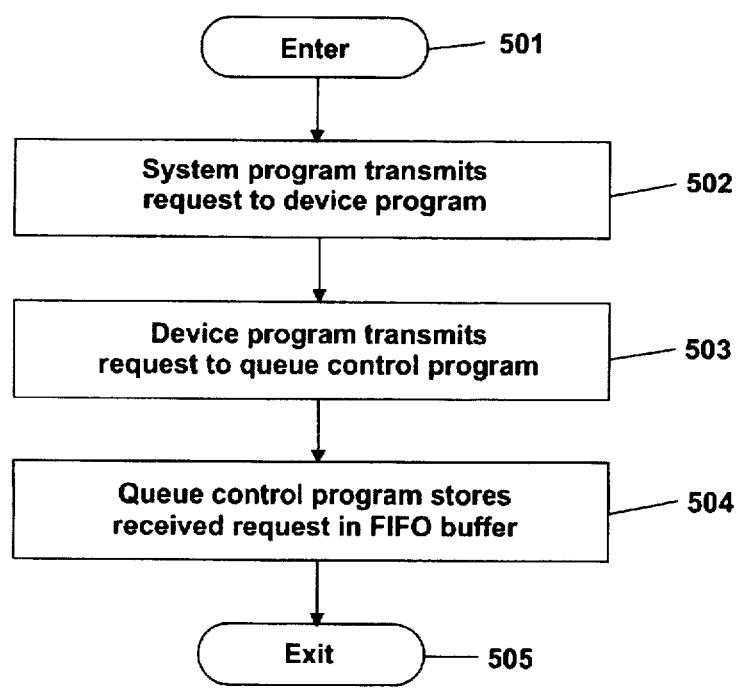
FIG. 5 is a flowchart showing the outline processing for each program of the present invention.

The summary of the operations of the queue control program 407 and of the device programs 401, 403 and 405 will now be described while referring to FIG. 5. First, the system program 400 sends a request to a corresponding device program (block 502). The device program that receives the request retransmits it to the queue control program 407. The queue control program 407 sequentially accumulates the requests that it receives from the individual device programs in a queue control program FIFO buffer.

Figure 6:
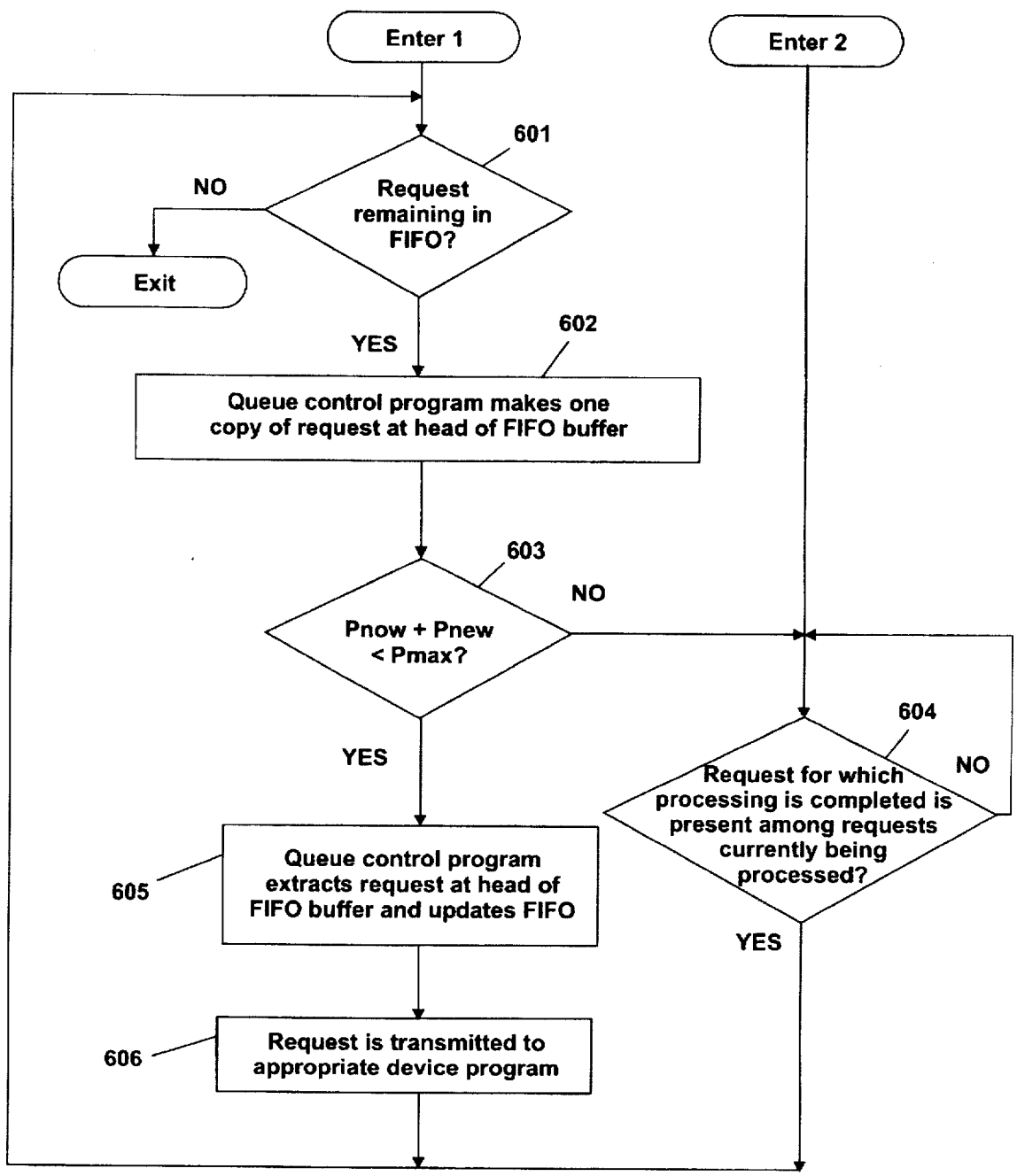
FIG. 6 is a flowchart showing the outline processing for the queue control program of the present invention.

The internal operation of the queue control program 407 will be described while referring to FIG. 6.

After a request from a device program has been registered in the FIFO buffer, program control enters the queue control program 407 at entrance 1. At block 601, the queue control program 407 determines whether or not there is a request remaining in the FIFO buffer. If the result of the determination is No, the queue control program 407 goes on standby until it is again activated by a control program. If the result is Yes, at block 602, the queue control program 407 copies one request positioned at the head of the FIFO buffer. The contents of the FIFO buffer are not updated at this time.

At block 603, the power (Pnew) required for the processing of the request copied from the FIFO is obtained by referring to the table in FIG. 7, and is added to the sum of the power required for the requests currently being serviced (Pnow). Then, the sum (Psum) that is obtained by adding together Pnow and Pnew is compared with the maximum power (Pmax) that can be allocated for the operation of target devices. When Psum exceeds Pmax, at block 604 program control goes on standby until at least one of the requests currently being serviced is completed. When the execution of at least one of the requests is completed, program control returns to block 601.

If, at block 603, the result of the comparison is Yes, at block 605, the copied request is extracted from the FIFO and the contents of the FIFO are updated. Following this, at block 606, the extracted request is transmitted to the appropriate destination device program, and program control thereafter returns to block 601. After the device program has completed the servicing for the received request, the queue control program 407 is reentered at entrance 2 and the procedure at block 604 is executed thereafter.

The above described processes are repetitively performed to handle a plurality of requests.

Examples of the device programs and the queue control program 407, which were explained while referring to FIGS. 5 and 6, will now be described while referring to FIG. 8.

At row No. 1 in FIG. 8, first, the system program 400 issues an "FD reading" request. Since no request was issued before the "FD reading" request, we assume that all the individual devices are halted. By referring to FIG. 7 it is found that to service the "FD reading" request a new power allocation (Pnew) of "200 mW" is required. Since the power currently being used is "0mW", the sum Psum, which is obtained by adding the new power allocation Pnew to the current consumed power Pnow, is 200 mW+0mW=200 mW. As 200 mW is smaller than the maximum power capacity of 800 mW for the present system, the result of the determination at block 603 in FIG. 6 is Yes and the "FD reading" request is transmitted to the corresponding FDD control program 401, which in turn controls the FDD 402 in consonance with the "FD reading" request. After the "FD reading" request is serviced by the FDD 402, the FDD control program 401 returns the result to the system program 400. The processing series is thereafter terminated.

At row No. 2, the system program 400 issues a "CD-ROM reading" request, and the processing performed for row No. 1 is repeated for row No. 2. This time, however, the processing differs from the previous processing because Pnow is already 200 mW. More specifically, since the FDD reading request at row No. 1 is being serviced when the determination at block 603 in FIG. 6 is performed and Pnow is therefore 200 mW, and since it is determined, by referring to FIG. 7, that Pnew is 400 mW, as a result of the determination at block 603 in FIG. 6 it is found that the sum Psum, which is obtained by adding together Pnew and Pnow, is 600 mW. Since this value does not exceed 800 mW, the Pmax, the "CD-ROM reading" request is returned to the device control program from which it was received. Thereafter, the same processing is performed as was performed at row No. 1.

A request at row No. 3 is for "HD writing", and the Pnew for it is 350 mW. Since the sum Psum, obtained by adding together Pnow and Pnew, is 950 mW, it exceeds the Pmax of 800 mW. As a result, at the determination block 603 program control branches to No and the "HD writing" request is saved in a queue. When program control moves to row No. 4, there is a request for "FD writing", for which the Pnew is 300 mW. Since the sum Psum is 900 mW, it exceeds the Pmax of 800 mW. As a result, at the determination block 603 program control branches to No and the "FD writing" request is also saved in the queue.

When program control is shifted to row No. 5, at this time the processing is terminated for the "FD reading" request, the request at row No. 1. Since Pnew is −200 mW and Pnow is 600 mW, Psum is reduced to 400 mW.

At row No. 7, the "HD writing" request is extracted from the queue where it is being held on standby. As the current Pnow is 400 mW and Psum is therefore 750 mW, which is smaller than Pmax, the "HD writing" request is sent to the corresponding control program 405 for servicing.

At rows No. 8 and No. 9, the "FD writing" request is extracted from the queue where it is being held on standby. But as the current Psum of 1050 mW is greater than Pmax, this request is again saved in the queue and is held on standby. At row No.10, the processing for the "CD-ROM reading" request is completed. Psum is thereby reduced to 350 mW at this time.

At rows No. 11 and No. 12, the "FD writing" request is extracted from the queue where it is being held on standby. Since the current Psum, 650 mW, does not exceed Pmax, this request is forwarded for servicing.

At row No. 13, the "HD writing" being processed is completed and the current Pnow is 300 mW.

At row No. 14, the "FD writing" being processed is completed and the current Pnow is 0mW.

In this manner, by taking the maximum power consumption into consideration, the queue control program 407 can employ the queue to handle various requests sequentially received from the system program 400.

In the drawings and specifications there has been set forth a preferred embodiment of the invention and, although specific terms are used, the description thus given uses terminology in a generic and descriptive sense only and not for purposes of limitation.

What is claimed is:

1. A computer system comprising:

a processor executing programs;

memory operatively connected with said processor and storing programs executable by said processor;

a peripheral device operatively connected with said processor and said memory and exchanging data therewith;

a table established in said memory in which is entered data indicative of the power consumption required to operate said peripheral device;

a peripheral control program stored in said memory and executable by said processor for controlling said peripheral device in consonance with an operation request; and a queue control program stored in said memory and executable by said processor for,
   (1) upon receipt of said operation request, reading from said table said power consumption required for said peripheral device when handling said operation request,
   (2) comparing said required power consumption with a currently available maximum power and
   (3)(i) when said power consumption that is read is equal to or less than a currently available maximum power capacity, transmitting said operation request to said peripheral control program,
      (ii) when said power consumption that is read exceeds said currently available maximum power capacity, said queue control program saves said operation request in a queue and goes into a standby mode until at least one request currently being processed is completed, and
   wherein after said at least one request is completed said queue control program reads from said table said power consumption required for said peripheral device to process said operation request and if said power consumption that is read is equal to or less than said currently available maximum power capacity, said queue control program transmits said operation request from said queue to said peripheral control program.

2. A computer system according to claim 1, wherein, when at least a first and second operation requests are held in said queue, said queue control program reads, after a current request is completed, from said table said power consumption required for said first operation request, and wherein, when said power consumption that is read is equal to or less than said currently available maximum power capacity, said queue control program transmits said first operation request to said peripheral control program and updates said queue by moving said second operation request to a front of said queue.

3. A computer system comprising:

a processor executing programs;

memory operatively connected with said processor and storing programs executable by said processor;

a plurality of peripheral devices, each said peripheral device operatively connected with said processor and said memory and exchanging data therewith;

a power source for which a maximum power capacity is determined that for simultaneous operation can be allocated to said plurality of peripheral devices;

a table established in said memory in which is stored for each of said plurality of peripheral devices a power consumption required for operation;

a plurality of peripheral control programs for respectively controlling operations of said plurality of peripheral devices in consonance with an operation request; and a queue control program for, (1) upon receipt of said operation request, reading from said table said power consumption required for handling said operation request, and (2) when said power consumption that is read is equal to or less than said maximum power capacity, transmitting said operation request to one of said peripheral control programs, and (3) when said power consumption that is read exceeds said maximum power capacity, saving said operation request in a queue, and changing to a standby mode until at least one request currently being processed is completed, and wherein after said at least one request is completed said queue control program reads from said table said power consumption required for said peripheral device to process said operation request and if said power consumption that is read is equal to or less than said currently available maximum power capacity, said queue control program transmits said operation request from said queue to said peripheral control program.

4. In a computer system to which is connected a plurality of peripheral devices and which has power management means, the improvement comprising:

(a) a power source for which a maximum power capacity is determined that for simultaneous operation can be allocated to said plurality of peripheral devices;

(b) a table in which is stored for each of said plurality of peripheral devices a power consumption required for operation;

(c) a plurality of control programs for respectively controlling operations of said plurality of peripheral devices in consonance with an operation request; and (d) a queue control program for, upon receipt of said operation request, reading from said table said power consumption required for handling said operation request, and for, when said power consumption that is read is equal to or less than a value obtained by subtracting a power consumption employed for an operation request currently being processed from said maximum power capacity, transmitting said operation request to a corresponding control program, and when said power consumption that is read exceeds said value, saving said operation request in a queue, and changing to a standby mode until at least one request currently being processed is completed, and wherein after said at least one request is completed said queue control program reads from said table said power consumption required for handling said operation request and if said power consumption that is read is equal to or less than a currently available maximum power capacity, said queue control program transmits said operation request from said queue to a corresponding control program.

5. A power management apparatus, for a computer system that includes a plurality of modules, comprising:

a table in which for each of said plurality of modules is entered a power consumption required to process an operation request;

control programs, each of which correspond to one of said plurality of modules, for controlling operations by each of said plurality of modules in consonance with operation requests; and a queue control program for, upon receipt of said operation request, reading from said table said power consumption required for one of said modules to process said operation request; for, when said power consumption that is read is equal to or less than a currently available maximum power capacity, transmitting said operation request to said control program; and for, when said power consumption that is read exceeds said currently available maximum power capacity, saving said operation request in a queue, and wherein when said operation request is held in said queue and is not yet being processed, said queue control program reads, from said table at a predetermined time interval, said power consumption required to process said operation request; and wherein, when said power consumption that is read is equal to or less than said currently available maximum power capacity, said queue control program transmits said operation request to said control program.

* * * * *